(12) United States Patent
Lai et al.

(10) Patent No.: US 10,684,453 B2
(45) Date of Patent: Jun. 16, 2020

(54) OPTICAL LENS AND PROJECTION DEVICE HAVING THE SAME

(71) Applicant: Young Optics Inc., Hsinchu (TW)

(72) Inventors: Sheng-Tang Lai, Hsinchu (TW); Kuo-Chuan Wang, Hsinchu (TW); Yuan-Hung Su, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 297 days.

(21) Appl. No.: 15/846,776

(22) Filed: Dec. 19, 2017

(65) Prior Publication Data
US 2019/0079275 A1    Mar. 14, 2019

(30) Foreign Application Priority Data
Sep. 8, 2017   (TW) .............................. 106130886 A

(51) Int. Cl.
| | |
|---|---|
| *G02B 13/16* | (2006.01) |
| *G02B 27/42* | (2006.01) |
| *G02B 13/18* | (2006.01) |
| *G02B 9/60* | (2006.01) |

(52) U.S. Cl.
CPC .............. *G02B 13/16* (2013.01); *G02B 9/60* (2013.01); *G02B 13/18* (2013.01); *G02B 27/4222* (2013.01)

(58) Field of Classification Search
CPC .......... G02B 13/16; G02B 9/60; G02B 13/18; G02B 27/4222; G02B 13/0045; G02B 9/62; G02B 16/001; G02B 27/18; G03B 21/14; G06T 7/521
See application file for complete search history.

(56) References Cited

U.S. PATENT DOCUMENTS

| | | | | |
|---|---|---|---|---|
| 8,456,758 B1* | 6/2013 | Huang | ............... | G02B 13/0045 359/714 |
| 2012/0026606 A1* | 2/2012 | Lee | ......................... | G02B 13/18 359/716 |
| 2015/0036044 A1* | 2/2015 | Hsu | ..................... | G02B 13/0045 348/373 |
| 2016/0282587 A1* | 9/2016 | Hashimoto | ........ | G02B 13/0045 |
| 2017/0038557 A1* | 2/2017 | Chen | .................. | G02B 13/0045 |

* cited by examiner

*Primary Examiner* — Kimberly N. Kakalec
(74) *Attorney, Agent, or Firm* — Muncy, Geissler, Olds & Lowe, P.C.

(57) ABSTRACT

An optical lens includes five aspheric lenses and an aperture stop. The five aspheric lenses are, arranged in order from a first side to a second side, a first lens, a second lens, a third lens, a fourth lens and a fifth lens, and the aperture stop is disposed between the first lens and the second lens. An image height at the image plane is denoted as H, the image height is equally divided into ten sections to from ten height positions 0.1H, 0.2H, 0.3H, 0.4H, 0.5H, 0.6H, 0.7H, 0.8H, 0.9H and 1H. Chief rays traveling through the optical lens and to the ten height positions respectively form ten angles with respect to a normal of an image plane, and each of the ten angles is smaller than 10 degrees.

20 Claims, 14 Drawing Sheets

OPTICAL LENS AND PROJECTION DEVICE HAVING THE SAME

BACKGROUND OF THE INVENTION a. Field of the Invention

The invention relates to an optical lens and a projection device having the optical lens.

b. Description of the Related Art 3D mapping, which is based on trigonometric principles, uses a projector to cast a pattern of coded or structured light onto a surface of an object to form 3D modulated images modulated by the surface of the object. A camera system captures the 3D modulated images to acquire 2D patterns of distorted stripes, with the distorted degree depending on relative positions between the projector and the camera system and height variations of the surface of the object. Distortion of light indicates depth variations of the surface, and discontinuity of light indicates physical gaps formed on the surface. Therefore, the distorted stripes may represent a depth-mapping pattern. The structured light, which is based on technology developed in the early 1970', may achieve large field-of-view, high precision, high accessibility, high response speed and active controls, and thus it is widely used in the industry.

The structured light can be of a variety types, such as point structured light, linear structured light and multi-linear structured light that are classified by the beam shape of a projection light source and selected according to the object to be mapped. Using point structured light may simplify and speed the mapping process, but the information is gathered only one point at a time to thus also need a scanner to realize large-scope mapping. The linear structured light is more widely used because it may gather more information without increasing processing complexity. The use of multi-linear structured light is similar to the mode of operation of a grating to gather information of a large scope, but it may add processing complexity. FIG. 1 shows a schematic diagram illustrating the mode of operation of multi-linear structured light. Referring to FIG. 1, a projector 100 projects light beams 110 onto a surface 120 of an object to form 3D modulated images modulated by the surface 120. A camera system 130 is disposed opposite the projector 100 to capture the 3D modulated images and thus acquire 2D patterns of distorted stripes.

BRIEF SUMMARY OF THE INVENTION

According to one aspect of the present disclosure, an optical lens includes five aspheric lenses and an aperture stop. The five aspheric lenses are, arranged in order from a first side to a second side, a first lens, a second lens, a third lens, a fourth lens and a fifth lens, and the aperture stop is disposed between the first lens and the second lens. A distance along an optical axis between a surface of the first lens facing the first side and an image plane on the second side is smaller than 5 mm. An image height at the image plane is denoted as H, the image height is equally divided into ten sections to from ten height positions 0.1H, 0.2H, 0.3H, 0.4H, 0.5H, 0.6H, 0.7H, 0.8H, 0.9H and 1H, chief rays traveling through the optical lens and to the ten height positions respectively form ten angles with respect to a normal of the image plane, and each of the ten angles is smaller than 10 degrees.

According to another aspect of the present disclosure, an optical lens includes five aspheric lenses and an aperture stop. The five aspheric lenses are, arranged in order from a first side to a second side, a first lens, a second lens, a third lens, a fourth lens and a fifth lens, and the aperture stop is disposed among the five aspheric lenses. A distance along an optical axis between a first surface of the first lens facing the first side and a second surface of the fifth lens facing the second side is smaller than 5 mm. An image height at the image plane on the second side is denoted as H, the image height is equally divided into ten sections to from ten height positions 0.1H, 0.2H, 0.3H, 0.4H, 0.5H, 0.6H, 0.7H, 0.8H, 0.9H and 1H, a chief ray originated from the height position of 0.4H and passing through the optical lens to reach the first surface of the first lens makes an angle B with the optical axis, a chief ray originated from the height position of 0.5H and passing through the optical lens to reach the first surface of the first lens makes an angle C with the optical axis, a difference between the angle B and the angle C is larger than 4.5 degrees, a chief ray originated from the height position of 0.3H and passing through the optical lens to reach the first surface of the first lens makes an angle A with the optical axis, and a difference between the angle B and the angle A is larger than 4.7 degrees.

According to another aspect of the present disclosure, a projection device includes a light source, a light valve and an optical lens including five aspheric lenses. The five aspheric lenses are a first lens, a second lens, a third lens, a fourth lens and a fifth lens arranged in order from a first side to a second side, the light valve is disposed between the light source and the fifth lens, and a distance along an optical axis between a surface of the first lens facing the first side and a surface of the fifth lens facing the second side is smaller than 5 mm. A first convex surface facing the first side is formed on an axial region of the first lens, a first concave surface facing the first side is formed on an axial region of the second lens, the third lens has a substantially meniscus shape, a second concave surface facing the first side is formed on an axial region of the third lens. A clear aperture of the fourth lens is larger than a clear aperture of the third lens, and an inflection point is formed on a surface of the fifth lens facing the first side.

According to the above embodiments, the optical lens has high light collection efficiency in the environment with limited space, has improved image quality and is favorable for miniaturization.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.).

The term "optical element" refers to an element made from at least in part a material that may refract, reflect, diffract, diffuse or filter at least a portion of the light passing through it. The material may include plastic or glass, and the optical element may be, for example, a lens, a prism or an aperture stop.

In an optical projection system, a magnified side may refer to one side of an optical path of an optical lens comparatively near a projected image (such as near an object to be mapped), and a minified side may refer to other side of the optical path comparatively near a light valve. In an image-pickup system, a magnified side may refer to one side of an optical path of an optical lens comparatively near a subject to be picked-up, and a minified side may refer to other side of the optical path comparatively near an image sensor.

A certain region of an object side surface (or an image side surface) of a lens may be convex or concave. Herein, a convex or concave region is more outwardly convex or inwardly concave in the direction of an optical axis as compared with other neighboring regions of the object/image side surface. An effective diameter (clear aperture diameter or clear aperture) refers to a diameter of an effective region for producing optical performance of a lens surface. For example, a flange or other positioning structure may be formed on an outer periphery of a lens for positioning or assembling, and it can be appreciated that the flange or other positioning structure is located outside the effective diameter. In certain cases, an object side surface and an image side surface of the same lens may have different clear apertures. In some embodiments, certain region of a lens surface may be designed as a concave portion or a convex portion, and the certain region may have symmetry with respect to an optical axis. Herein, the certain region may be an axial region, a periphery region or a middle region. The axial region is a part of a lens around the optical axis, the periphery region is a part of a lens next to and inside the periphery of a clear aperture, and the middle region is between the axial region and the periphery region. It can be comprehended by a person skilled in the art that the axial region, the periphery region or the middle region may extend outwardly or inwardly to a proper scope to provide sufficient optical characteristics.

Figure 1:
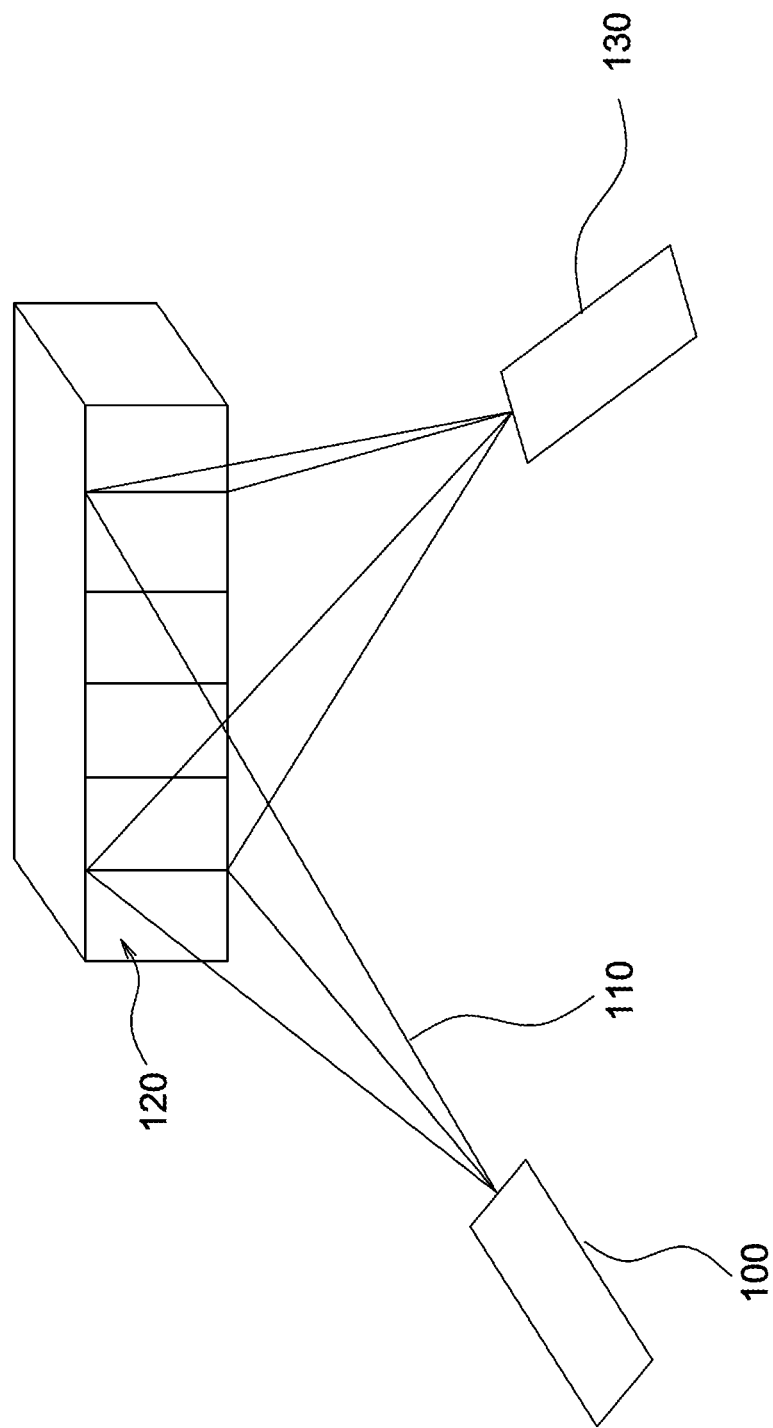
FIG. 1 shows a schematic diagram illustrating the mode of operation of multi-linear structured light.
Figure 2:
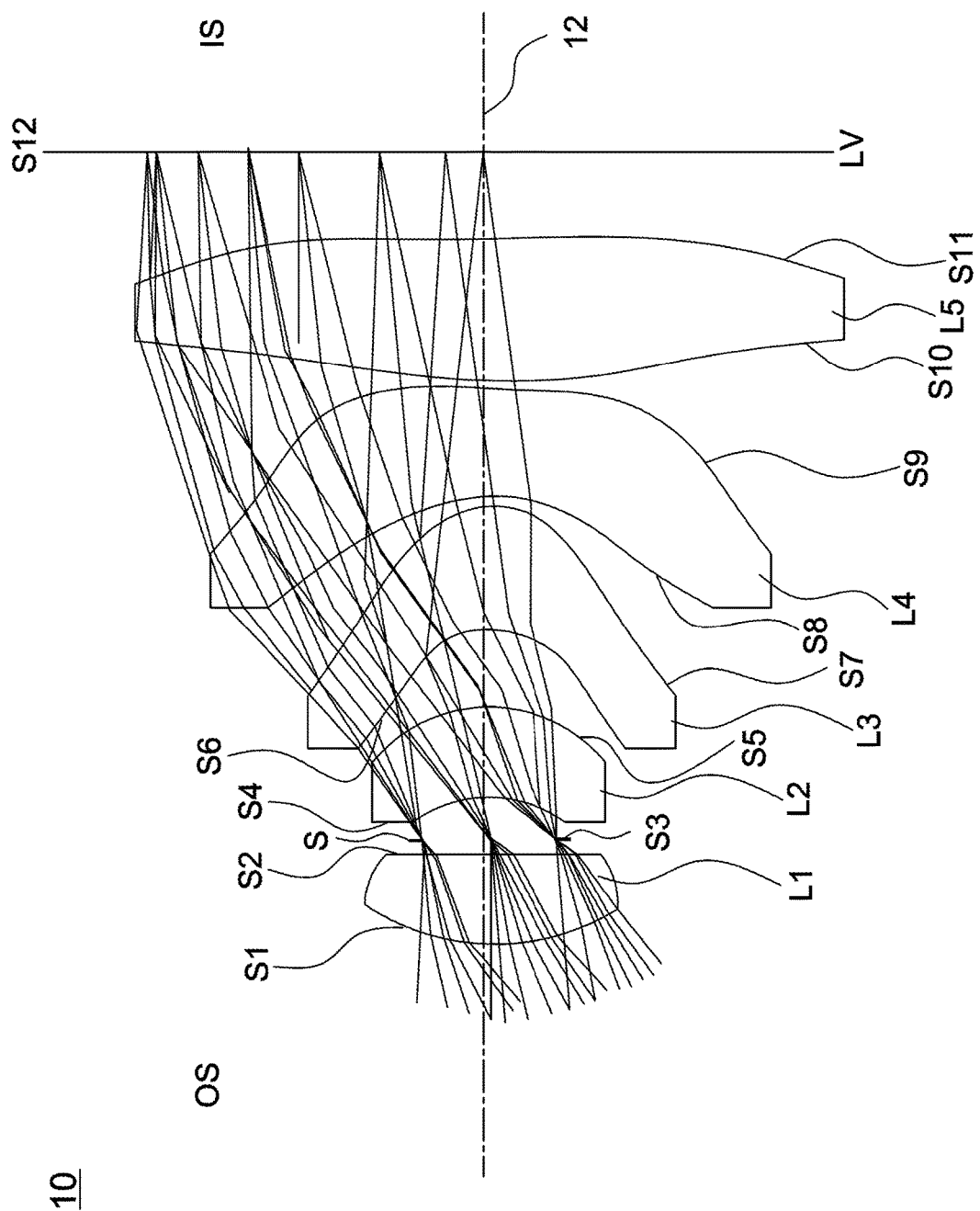
FIG. 2 show a schematic diagram of an optical lens according to a first embodiment of the invention.

FIG. 2 show a schematic diagram of an optical lens according to an embodiment of the invention. As shown in FIG. 2, in this embodiment, the optical lens 10 has a lens barrel (not shown), and inside the lens barrel a first lens L1, an aperture stop S, a second lens L2, a third lens L3, a fourth lens L4 and a fifth lens L5 are arranged in order from a first side (magnified side) to a second side (minified side). A light valve LV is disposed on the minified side of the optical lens 10 and between the fifth lens L5 and a light source (not shown). The aperture stop S is disposed between the first lens L1 and the second lens L2 of the optical lens 10. In this embodiment, the magnified side OS of the optical lens 10 is located towards an object to be mapped, and a minified side IS of the optical lens 10 is located towards the light valve LV. According to various embodiments of the invention, the magnified side OS is the left-hand side, and the minified side IS is the right-hand side of each figure, and thus not repeatedly describing in detail.

The aperture stop S may be an independent component or integrally formed with other optical element. In this embodiment, the aperture stop S may use a mechanic piece to block out peripheral light and transmit central light to achieve aperture effects. The mechanic piece may be adjusted by varying its position, shape or transmittance. In other embodiment, the aperture stop S may be formed by applying an opaque or a light-absorbing material on a lens surface except for a central area to block out peripheral light and transmits central light.

In this embodiment, the optical lens 10 includes five aspheric lenses arranged along an optical axis and having refractive powers of positive, positive, positive, negative, and negative from the magnified side (left side) to the minified side (right side). In this embodiment, all lenses L1-L5 are made from plastic. In other embodiment, at least one of the lenses L1-L5 may be made of glass molding. Further, the overall refractive power of the optical lens 10 is positive.

Each of the lenses L1-L5 has a clear aperture (CA). The clear aperture used herein refers to a maximum area of a lens that light may pass through.

The light valve LV, which is a commonly used device, is a kind of spatial light modulator. The light valve LV is capable of converting illumination beams into image beams and may be a DMD, an LCD, an LCOS, a slide, a hologram, a mask with patterns, etc. In this embodiment, the light valve LV is a mask with patterns.

Design parameters of lenses and surrounding components of the first embodiment are listed in Table 1. The design data listed in the following are not intended to limit the invention. Accordingly, many modifications and variations on the parameters or settings without departing from the spirit of the invention or essential characteristics thereof will be apparent to practitioners skilled in this art.

TABLE 1

F/# = 2.68; EFL = 1.54 (mm); Image Height = 2.851 (mm)
TTL = 2.91 (mm); FOV = 88.2 degrees (diagonal line)

| surface | radius of curvature (mm) | interval (mm) | refractive index | Abbe number | clear aperture (mm) | object description |
|---|---|---|---|---|---|---|
| S1* | 0.996 | 0.314 | 1.66 | 20.35 | 0.51 | L1 |
| S2* | 2.921 | 0.063 | | | 0.38 | |
| S3 | INF | 0.143 | | | 0.27 | aperture stop |
| S4* | −0.968 | 0.347 | 1.66 | 20.35 | 0.33 | L2 |
| S5* | −0.549 | 0.288 | | | 0.49 | |
| S6* | −0.369 | 0.455 | 1.66 | 20.35 | 0.54 | L3 |
| S7* | −0.341 | 0.030 | | | 0.75 | |

TABLE 1-continued

F/# = 2.68; EFL = 1.54 (mm); Image Height = 2.851 (mm)
TTL = 2.91 (mm); FOV = 88.2 degrees (diagonal line)

| surface | radius of curvature (mm) | interval (mm) | refractive index | Abbe number | clear aperture (mm) | object description |
|---|---|---|---|---|---|---|
| S8* | −10.798 | 0.408 | 1.66 | 20.35 | 1.06 | L4 |
| S9* | −7.949 | 0.030 | | | 1.16 | |
| S10* | 26.806 | 0.500 | 1.66 | 20.35 | 1.44 | L5 |
| S11* | 0.332 | 0.331 | | | 1.46 | |
| S12 | INF | 0.000 | | | 1.43 | image plane |

In the above table, the surface denoted by an asterisk is an aspheric surface, and a surface without the denotation of an asterisk is a spherical surface.

The radius of curvature is a reciprocal of the curvature. When the curvature is positive, the center of a lens surface is located towards the minified side. When the curvature is negative, the center of a lens surface is located towards the magnified side. The concavity and convexity of each lens surface is listed in the above table and shown in corresponding figures.

The Symbol F/# shown in the above table is an aperture value of the aperture stop.

When the optical lens is used in a projection system, the image plane is provided on a light valve, and, when the optical lens is used in an image pick-up system, the image plane is a sensing surface of a light sensor.

In the embodiments of the invention, an effective focal length of the optical lens 10 is denotes as "EFL", as shown in the above table.

When the optical lens is used in a projection system, an image circle refers to a maximum effective area of a light valve for emitting image beams, and an image height equals half of the image circle. In comparison, when the optical lens is used in an image pick-up system, the image circle refers to a diagonal length of an image on an image plane, and an image height equals half of the image circle.

A total track length of the optical lens 10 is denotes as "TTL" in the above table. Specifically, a total track length is a distance along the optical axis 12 between a lens surface 51 nearest the magnified side and the image plane S12.

In this embodiment, when the optical lens is used in a projection system, the FOV denoted in the above table is an angle made between the lens surface nearest the magnified side and the optical axis of the optical lens, i.e., a field of view measured diagonally.

In the following design examples of the invention, each aspheric surface satisfies the following equation:

$$Z = \frac{cr^2}{1 + \sqrt{1 - (1+k)c^2 r^2}} + \sum_{i=1}^{N} \alpha_i r^i,$$

where Z denotes a sag of an aspheric surface along the optical axis, c denotes a reciprocal of a radius of an osculating sphere, K denotes a Conic constant, r denotes a height of the aspheric surface measured in a direction perpendicular to the optical axis, and $\alpha_i$ are aspheric coefficients of each order. Table 2 lists aspheric coefficients and conic constant of each aspheric surface of the optical lens according to a first embodiment of the invention.

TABLE 2

| | S1 | S2 | S4 | S5 | S6 |
|---|---|---|---|---|---|
| k | −6.56E−01 | −7.26E+00 | −2.48E+00 | −1.12E+01 | −1.85E+00 |
| $\alpha_1$ | 0.00E+00 | 0.00E+00 | 0.00E+00 | 0.00E+00 | 0.00E+00 |
| $\alpha_2$ | 0.00E+00 | 0.00E+00 | 0.00E+00 | 0.00E+00 | 0.00E+00 |
| $\alpha_3$ | 0.00E+00 | 0.00E+00 | 0.00E+00 | 0.00E+00 | 0.00E+00 |
| $\alpha_4$ | −2.10E−02 | −1.26E−01 | −1.43E+00 | −6.63E+00 | −3.82E+00 |
| $\alpha_5$ | 0.00E+00 | 0.00E+00 | 0.00E+00 | 0.00E+00 | 0.00E+00 |
| $\alpha_6$ | 2.36E+00 | −7.10E+00 | −6.91E+00 | 5.70E+01 | 6.16E+00 |
| $\alpha_7$ | 0.00E+00 | 0.00E+00 | 0.00E+00 | 0.00E+00 | 0.00E+00 |
| $\alpha_8$ | −2.80E+01 | 1.29E+02 | 5.63E+01 | −3.58E+02 | 6.81E+01 |
| $\alpha_9$ | 0.00E+00 | 0.00E+00 | 0.00E+00 | 0.00E+00 | 0.00E+00 |
| $\alpha_{10}$ | 1.72E+02 | −1.64E+03 | −2.10E+02 | 1.32E+03 | −4.36E+02 |
| $\alpha_{11}$ | 0.00E+00 | 0.00E+00 | 0.00E+00 | 0.00E+00 | 0.00E+00 |
| $\alpha_{12}$ | −5.91E+02 | 9.52E+03 | 0.00E+00 | −2.66E+03 | 9.25E+02 |
| $\alpha_{13}$ | 0.00E+00 | 0.00E+00 | 0.00E+00 | 0.00E+00 | 0.00E+00 |
| $\alpha_{14}$ | 7.34E+02 | −2.02E+04 | 0.00E+00 | 2.61E+03 | −6.50E+02 |
| $\alpha_{15}$ | 0.00E+00 | 0.00E+00 | 0.00E+00 | 0.00E+00 | 0.00E+00 |
| $\alpha_{16}$ | 0.00E+00 | 0.00E+00 | 0.00E+00 | 0.00E+00 | 0.00E+00 |

| | S7 | S8 | S9 | S10 | S11 |
|---|---|---|---|---|---|
| k | −1.01E+00 | 1.33E+00 | 3.43E+01 | 8.00E+01 | −3.06E+00 |
| $\alpha_1$ | 0.00E+00 | 0.00E+00 | 0.00E+00 | 0.00E+00 | 0.00E+00 |
| $\alpha_2$ | 0.00E+00 | −4.48E−01 | 0.00E+00 | −1.38E−02 | −1.39E+00 |
| $\alpha_3$ | 0.00E+00 | −3.59E−01 | 0.00E+00 | 4.82E−02 | 1.33E+00 |
| $\alpha_4$ | 2.67E−01 | 3.04E−01 | −6.99E−01 | 3.17E−01 | −5.06E−01 |
| $\alpha_5$ | 0.00E+00 | 9.41E−02 | 0.00E+00 | −4.75E−03 | −8.54E−02 |
| $\alpha_6$ | −1.11E+00 | 9.16E−02 | 1.31E+00 | −4.13E−01 | 1.22E−01 |
| $\alpha_7$ | 0.00E+00 | −3.65E−03 | 0.00E+00 | −1.13E−03 | 2.84E−03 |
| $\alpha_8$ | −1.82E+00 | 6.38E−03 | −2.44E+00 | 1.80E−01 | −8.51E−02 |
| $\alpha_9$ | 0.00E+00 | −1.69E−02 | 0.00E+00 | −4.30E−04 | 9.41E−04 |
| $\alpha_{10}$ | 2.27E+01 | −4.19E−02 | 2.64E+00 | −2.37E−02 | 3.90E−02 |
| $\alpha_{11}$ | 0.00E+00 | −1.54E−02 | 0.00E+00 | −5.52E−05 | 2.85E−03 |
| $\alpha_{12}$ | −3.70E+01 | −1.22E−03 | −1.51E+00 | −1.71E−03 | −9.05E−03 |

TABLE 2-continued

| | | | | | |
|---|---|---|---|---|---|
| $\alpha_{13}$ | 0.00E+00 | 4.25E−03 | 0.00E+00 | 2.17E−05 | 1.84E−04 |
| $\alpha_{14}$ | 1.71E+01 | 1.84E−02 | 3.64E−01 | 4.21E−04 | 3.99E−04 |
| $\alpha_{15}$ | 0.00E+00 | 0.00E+00 | 0.00E+00 | 0.00E+00 | 0.00E+00 |
| $\alpha_{16}$ | 0.00E+00 | 0.00E+00 | 0.00E+00 | 0.00E+00 | 0.00E+00 |

Further, in this embodiment, a ratio of a total track length TTL to an image circle Ic at the image plane of the optical lens 10 (TTL/Ic) is 0.90. It may produce the effect of space saving when the ratio of TTL/Ic is smaller than 1.2. Such effect is more significant when the ratio of TTL/Ic is smaller than 1.1, and is most significant when the ratio of TTL/Ic is smaller than 1.0. The effect of space saving may, for example, allow for better optical performance in a limited space when the optical lens 10 is installed in a portable electronic device.

In this embodiment, in the optical lens 10 a distance L along the optical axis 12 between the surface Si of the first lens L1 near a first side and the surface S11 of the fifth lens L5 near the second side is smaller than 3 mm. It may produce the effect of space saving when the distance L is smaller than 5 mm. Such effect is more significant when the distance L is smaller than 4 mm, and is most significant when the distance L is smaller than 3 mm. The effect of space saving may, for example, allow for better optical performance in a limited space when the optical lens 10 is installed in a portable electronic device.

Further, in this embodiment, an image height formed at the image plane of the optical lens 10 is denoted as H, the image height H is equally divided into ten sections to from ten height positions 0.1H, 0.2H, 0.3H, 0.4H, 0.5H, 0.6H, 0.7H, 0.8H, 0.9H and 1H, the chief rays traveling through the optical lens 10 and to the ten height positions 0.1H-1H respectively form ten angles with respect to a normal of the image plane, and each of the ten chief ray angles is smaller than 7 degrees. It may produce the effect of improving light collection efficiency when the chief ray angle is smaller than 10 degrees, and the light collection efficiency is more improved when the chief ray angle is smaller than 8 degrees. Such effect of improving the light collection efficiency is most significantly when the chief ray angle is smaller than 7 degrees. The effect of improving the light collection efficiency may, for example, allow for better collection efficiency in a limited space when the optical lens 10 is installed in a portable electronic device.

Figure 3:
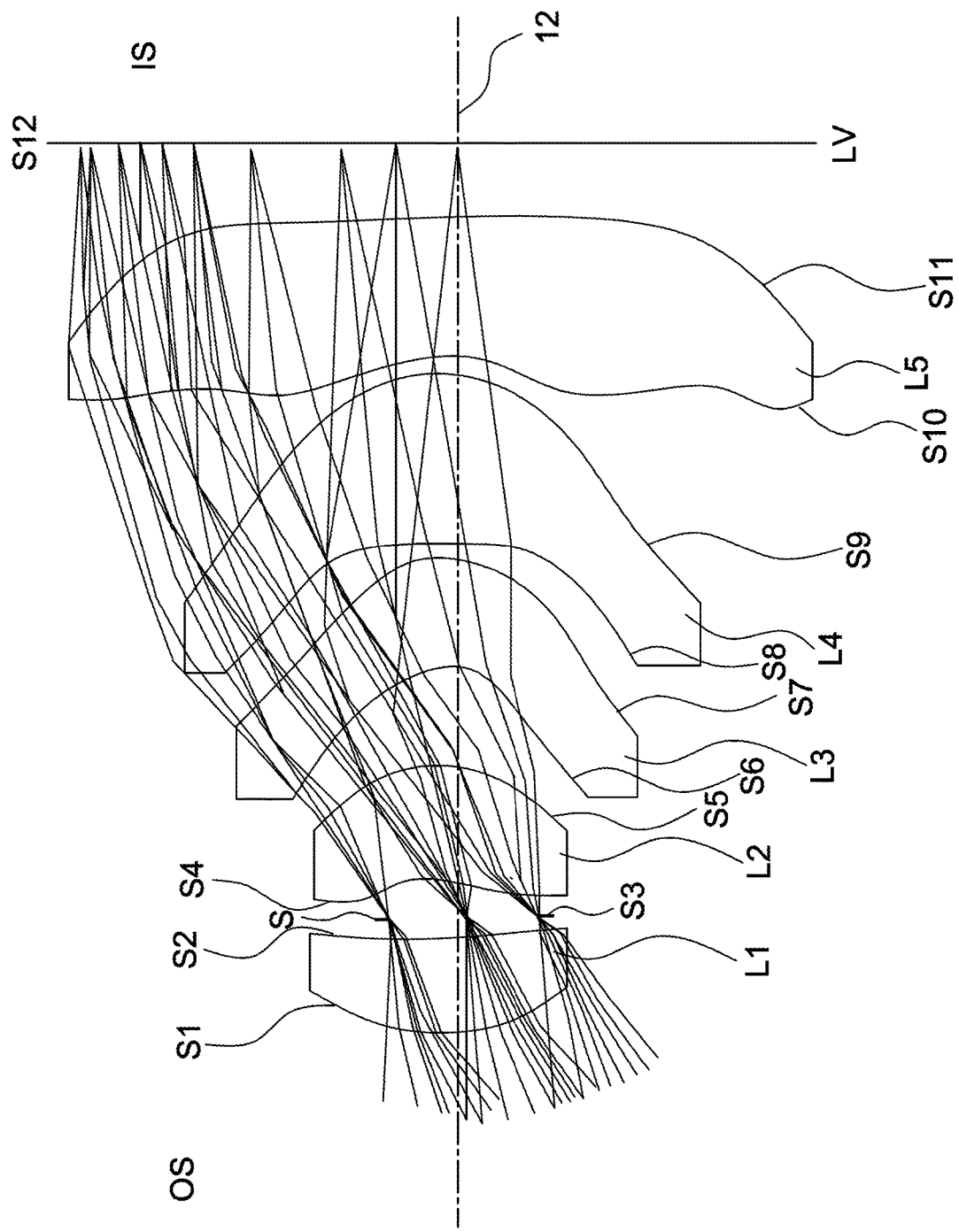
FIG. 3 shows a schematic diagram of an optical lens according to a second embodiment of the invention.

A design example of an optical lens according to a second embodiment of the invention is described below. FIG. 3 shows a schematic diagram of an optical lens according to a second embodiment of the invention. Design parameters of lenses and surrounding components of the second embodiment are listed in Table 3.

TABLE 3

F/# = 2.5; EFL = 1.55 (mm); Image Height = 2.851 (mm)
TTL = 2.58 (mm); FOV = 88.6 degrees (diagonal line)

| surface | radius of curvature (curvature) (mm) | interval (mm) | refractive index | Abbe number | clear aperture (mm) | object description |
|---|---|---|---|---|---|---|
| S1* | 0.926 | 0.303 | 1.66 | 20.35 | 0.49 | L1 |
| S2* | 1.554 | 0.080 | | | 0.34 | |
| S3 | INF | 0.095 | | | 0.27 | aperture stop S |
| S4* | −1.525 | 0.361 | 1.66 | 20.35 | 0.30 | L2 |
| S5* | −0.632 | 0.332 | | | 0.47 | |
| S6* | −0.296 | 0.355 | 1.66 | 20.35 | 0.56 | L3 |
| S7* | −0.401 | 0.050 | | | 0.75 | |
| S8* | −6.473 | 0.540 | 1.66 | 20.35 | 0.93 | L4 |
| S9* | −0.581 | 0.050 | | | 0.99 | |
| S10* | −0.596 | 0.423 | 1.66 | 20.35 | 1.35 | L5 |
| S11* | −11.895 | 0.300 | | | 1.42 | |
| S12 | INF | 0.000 | | | 1.43 | image plane |

Table 4 lists aspheric coefficients and conic constant of each aspheric surface of the optical lens according to the second embodiment of the invention.

TABLE 4

| | S1 | S2 | S4 | S5 | S6 |
|---|---|---|---|---|---|
| k | −5.65E+00 | −1.90E+01 | 1.96E+01 | 2.56E−01 | −8.97E−01 |
| $\alpha_1$ | 0.00E+00 | 0.00E+00 | 0.00E+00 | 0.00E+00 | 0.00E+00 |
| $\alpha_2$ | 0.00E+00 | 0.00E+00 | 0.00E+00 | 0.00E+00 | 0.00E+00 |
| $\alpha_3$ | 0.00E+00 | 0.00E+00 | 0.00E+00 | 0.00E+00 | 0.00E+00 |
| $\alpha_4$ | 9.22E−01 | 4.80E−01 | −7.22E−01 | 2.06E−01 | 2.98E+00 |
| $\alpha_5$ | 0.00E+00 | 0.00E+00 | 0.00E+00 | 0.00E+00 | 0.00E+00 |
| $\alpha_6$ | −6.33E−01 | −4.93E+00 | 2.14E+00 | 6.67E−01 | −2.71E+00 |
| $\alpha_7$ | 0.00E+00 | 0.00E+00 | 0.00E+00 | 0.00E+00 | 0.00E+00 |
| $\alpha_8$ | −1.96E+01 | 3.12E+01 | −3.95E+01 | −2.17E+00 | −5.49E+00 |
| $\alpha_9$ | 0.00E+00 | 0.00E+00 | 0.00E+00 | 0.00E+00 | 0.00E+00 |
| $\alpha_{10}$ | 2.03E+02 | −6.76E+02 | 4.29E+02 | 1.48E+01 | 1.07E+01 |
| $\alpha_{11}$ | 0.00E+00 | 0.00E+00 | 0.00E+00 | 0.00E+00 | 0.00E+00 |
| $\alpha_{12}$ | −9.25E+02 | 3.54E+03 | 0.00E+00 | 0.00E+00 | 0.00E+00 |
| $\alpha_{13}$ | 0.00E+00 | 0.00E+00 | 0.00E+00 | 0.00E+00 | 0.00E+00 |
| $\alpha_{14}$ | 1.45E+03 | 0.00E+00 | 0.00E+00 | 0.00E+00 | 0.00E+00 |
| $\alpha_{15}$ | 0.00E+00 | 0.00E+00 | 0.00E+00 | 0.00E+00 | 0.00E+00 |
| $\alpha_{16}$ | 0.00E+00 | 0.00E+00 | 0.00E+00 | 0.00E+00 | 0.00E+00 |

TABLE 4-continued

| | S7 | S8 | S9 | S10 | S11 |
|---|---|---|---|---|---|
| k | −7.76E−01 | 5.68E+00 | −1.99E+00 | −3.00E+00 | −9.90E+01 |
| $\alpha_1$ | 0.00E+00 | 0.00E+00 | 0.00E+00 | 0.00E+00 | 0.00E+00 |
| $\alpha_2$ | 0.00E+00 | 0.00E+00 | 0.00E+00 | 0.00E+00 | 0.00E+00 |
| $\alpha_3$ | 0.00E+00 | 0.00E+00 | 0.00E+00 | 0.00E+00 | 0.00E+00 |
| $\alpha_4$ | 7.65E−01 | −1.79E+00 | −9.82E−01 | 1.53E+00 | 9.60E−01 |
| $\alpha_5$ | 0.00E+00 | 0.00E+00 | 0.00E+00 | 0.00E+00 | 0.00E+00 |
| $\alpha_6$ | 2.22E+00 | −2.45E+00 | 3.75E+00 | −2.64E+00 | −3.41E+00 |
| $\alpha_7$ | 0.00E+00 | 0.00E+00 | 0.00E+00 | 0.00E+00 | 0.00E+00 |
| $\alpha_8$ | −3.22E+00 | 1.42E+01 | −1.34E+01 | 2.42E+00 | 5.35E+00 |
| $\alpha_9$ | 0.00E+00 | 0.00E+00 | 0.00E+00 | 0.00E+00 | 0.00E+00 |
| $\alpha_{10}$ | −4.82E+00 | −1.84E+01 | 2.37E+01 | −1.06E+00 | −4.70E+00 |
| $\alpha_{11}$ | 0.00E+00 | 0.00E+00 | 0.00E+00 | 0.00E+00 | 0.00E+00 |
| $\alpha_{12}$ | 1.11E+01 | 1.04E+01 | −1.93E+01 | −2.46E−04 | 2.37E+00 |
| $\alpha_{13}$ | 0.00E+00 | 0.00E+00 | 0.00E+00 | 0.00E+00 | 0.00E+00 |
| $\alpha_{14}$ | 0.00E+00 | −2.29E+00 | 6.02E+00 | 1.57E−01 | −6.49E−01 |
| $\alpha_{15}$ | 0.00E+00 | 0.00E+00 | 0.00E+00 | 0.00E+00 | 0.00E+00 |
| $\alpha_{16}$ | 0.00E+00 | 0.00E+00 | 0.00E+00 | −3.63E−02 | 7.57E−02 |

As shown in Table 3 and table 4, this embodiment is similar to the first embodiment except that the refractive powers of the lenses L1-L5 are positive, positive, positive, positive and negative, respectively. Further, the overall refractive power of the optical lens is positive.

Figure 4:
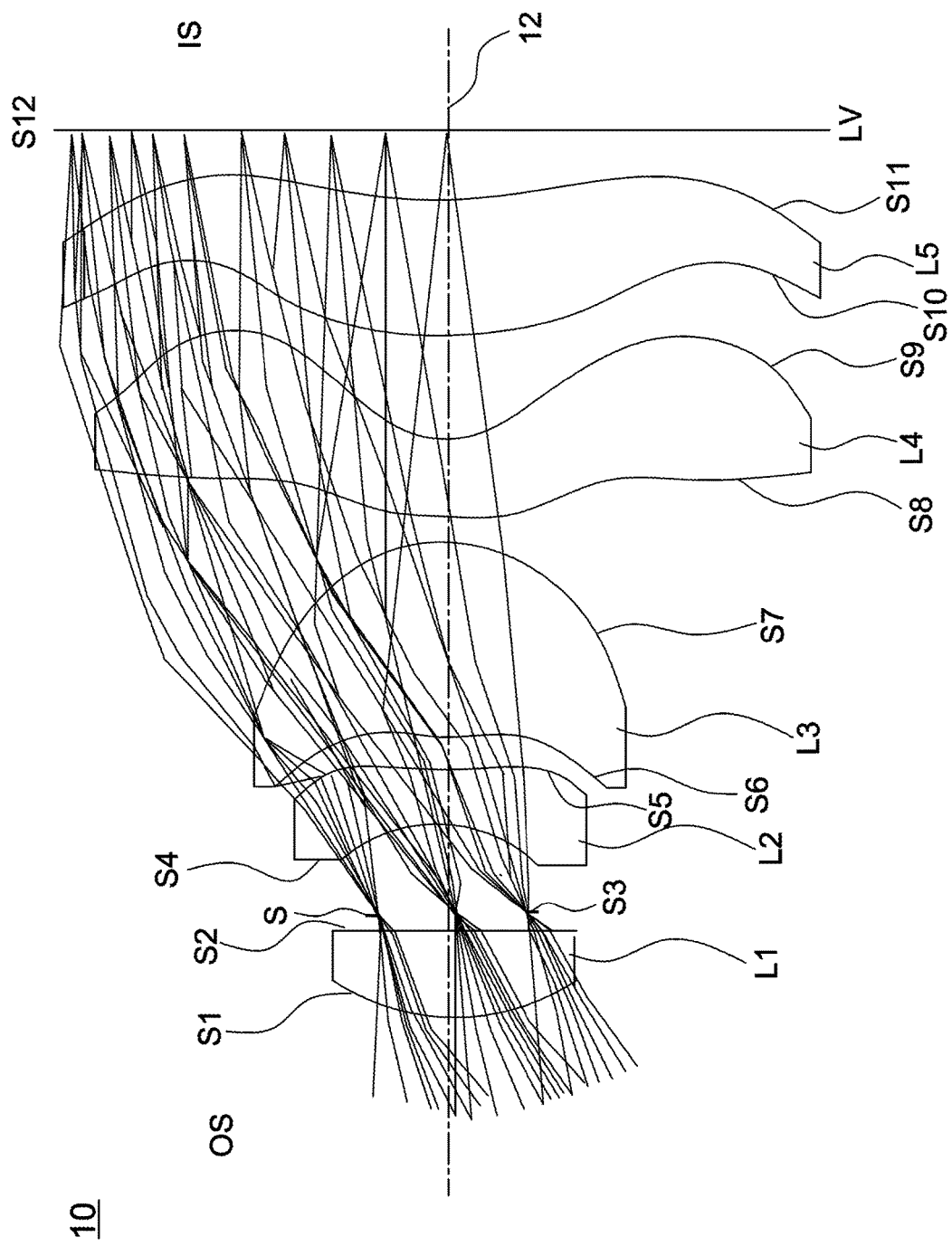
FIG. 4 shows a schematic diagram of an optical lens according to a third embodiment of the invention.

A design example of an optical lens 10 according to a third embodiment of the invention is described below. FIG. 4 shows a schematic diagram of an optical lens according to a third embodiment of the invention. Design parameters of lenses and surrounding components of the third embodiment are listed in Table 5.

TABLE 5

F/# = 2.6; EFL = 1.55 (mm); Image Height = 2.851 (mm)
TTL = 2.9 (mm); FOV = 88.6 degrees (diagonal line)

| surface | radius of curvature (curvature) (mm) | interval (mm) | refractive index | Abbe number | clear aperture (mm) | Object description |
|---|---|---|---|---|---|---|
| S1* | 1.128 | 0.263 | 1.67 | 19.46 | 0.48 | L1 |
| S2* | 3.022 | 0.063 | | | 0.37 | |
| S3 | INF | 0.272 | | | 0.28 | aperture stop S |
| S4* | −1.927 | 0.197 | 1.67 | 19.46 | 0.39 | L2 |
| S5* | 8.139 | 0.105 | | | 0.58 | |
| S6* | −3.495 | 0.605 | 1.67 | 19.46 | 0.64 | L3 |
| S7* | −0.605 | 0.030 | | | 0.79 | |
| S8* | 0.901 | 0.272 | 1.67 | 19.46 | 1.36 | L4 |
| S9* | 0.332 | 0.377 | | | 1.41 | |
| S10* | 1.333 | 0.415 | 1.67 | 19.46 | 1.44 | L5 |
| S11* | 1.368 | 0.300 | | | 1.48 | |
| S12 | INF | 0.000 | | | 1.43 | image plane |

Table 6 lists aspheric coefficients and conic constant of each aspheric surface of the optical lens according to the third embodiment of the invention.

TABLE 6

| | S1 | S2 | S4 | S5 | S6 |
|---|---|---|---|---|---|
| k | −2.72E−01 | −2.54E+01 | 2.05E+01 | 5.81E+01 | −6.68E+01 |
| $\alpha_1$ | 0.00E+00 | 0.00E+00 | 0.00E+00 | 0.00E+00 | 0.00E+00 |
| $\alpha_2$ | 0.00E+00 | 0.00E+00 | 0.00E+00 | 0.00E+00 | 0.00E+00 |
| $\alpha_3$ | 0.00E+00 | 0.00E+00 | 0.00E+00 | 0.00E+00 | 0.00E+00 |
| $\alpha_4$ | 9.78E−02 | −1.39E−01 | −1.08E−01 | −9.16E−01 | −3.39E−01 |
| $\alpha_5$ | 0.00E+00 | 0.00E+00 | 0.00E+00 | 0.00E+00 | 0.00E+00 |
| $\alpha_6$ | −2.27E+00 | −2.00E+00 | −1.78E+00 | 2.71E−01 | −1.85E+00 |
| $\alpha_7$ | 0.00E+00 | 0.00E+00 | 0.00E+00 | 0.00E+00 | 0.00E+00 |
| $\alpha_8$ | 2.34E+01 | 0.00E+00 | −9.02E+00 | −3.80E+00 | 8.89E+00 |
| $\alpha_9$ | 0.00E+00 | 0.00E+00 | 0.00E+00 | 0.00E+00 | 0.00E+00 |
| $\alpha_{10}$ | −1.71E+02 | 0.00E+00 | 0.00E+00 | 1.04E+00 | −3.77E+01 |
| $\alpha_{11}$ | 0.00E+00 | 0.00E+00 | 0.00E+00 | 0.00E+00 | 0.00E+00 |
| $\alpha_{12}$ | 5.54E+02 | 0.00E+00 | 0.00E+00 | 0.00E+00 | 5.00E+01 |
| $\alpha_{13}$ | 0.00E+00 | 0.00E+00 | 0.00E+00 | 0.00E+00 | 0.00E+00 |
| $\alpha_{14}$ | −7.42E+02 | 0.00E+00 | 0.00E+00 | 0.00E+00 | 6.63E+00 |
| $\alpha_{15}$ | 0.00E+00 | 0.00E+00 | 0.00E+00 | 0.00E+00 | 0.00E+00 |
| $\alpha_{16}$ | 0.00E+00 | 0.00E+00 | 0.00E+00 | 0.00E+00 | 0.00E+00 |
| | S7 | S8 | S9 | S10 | S11 |
| k | −7.35E−01 | −3.93E+00 | −2.24E+00 | −1.23E+01 | −2.98E+01 |
| $\alpha_1$ | 0.00E+00 | 0.00E+00 | 0.00E+00 | 0.00E+00 | 0.00E+00 |
| $\alpha_2$ | 0.00E+00 | 7.78E−02 | −2.68E−01 | 0.00E+00 | 0.00E+00 |
| $\alpha_3$ | 0.00E+00 | −1.48E−01 | 1.77E−01 | 0.00E+00 | 0.00E+00 |

TABLE 6-continued

| | | | | | |
|---|---|---|---|---|---|
| $\alpha_4$ | 3.06E−01 | −5.00E−01 | −4.04E−01 | 3.98E−02 | −2.17E−01 |
| $\alpha_5$ | 0.00E+00 | 2.77E−03 | −2.77E−02 | 0.00E+00 | 0.00E+00 |
| $\alpha_6$ | 1.21E−01 | 4.35E−01 | 3.44E−01 | 2.00E−01 | 2.54E−01 |
| $\alpha_7$ | 0.00E+00 | −1.40E−02 | −1.06E−02 | 0.00E+00 | 0.00E+00 |
| $\alpha_8$ | −8.08E+00 | 1.70E−01 | −3.09E−01 | −2.71E−01 | −4.65E−02 |
| $\alpha_9$ | 0.00E+00 | 9.84E−04 | −5.19E−03 | 0.00E+00 | 0.00E+00 |
| $\alpha_{10}$ | 3.27E+01 | −4.06E−01 | 1.95E−01 | −1.11E−02 | −1.64E−01 |
| $\alpha_{11}$ | 0.00E+00 | 4.68E−05 | −3.43E−04 | 0.00E+00 | 0.00E+00 |
| $\alpha_{12}$ | −6.00E+01 | 2.02E−01 | −7.04E−02 | 8.65E−02 | 1.12E−01 |
| $\alpha_{13}$ | 0.00E+00 | 1.15E−03 | 1.50E−03 | 0.00E+00 | 0.00E+00 |
| $\alpha_{14}$ | 4.16E+01 | −3.35E−02 | 1.09E−02 | −2.20E−02 | −2.07E−02 |
| $\alpha_{15}$ | 0.00E+00 | 0.00E+00 | 0.00E+00 | 0.00E+00 | 0.00E+00 |
| $\alpha_{16}$ | 0.00E+00 | 0.00E+00 | 0.00E+00 | 0.00E+00 | 0.00E+00 |

As shown in Table 5 and table 6, this embodiment is similar to the first embodiment except that the refractive power of the lenses L1-L5 are positive, negative, positive, negative and positive, respectively, and that the lens surface S11 of the fifth lens closest to the image plane S12 is a diffractive optical surface. Further, the overall refractive power of the optical lens is positive.

In this embodiment, a diffractive optical surface polynomial may be expressed as the following:

$$\phi(r) = (2\pi/\lambda_0) \Sigma C_n r^{2n} \quad (2)$$

where $\phi(r)$ denotes a phase function of a diffractive optical element, r denotes a radial distance relative to the optical axis of the optical lens, and $\lambda 0$ denotes a reference wavelength (940 nm). That is, a diffractive optical surface is a lens surface that possesses a diffractive phase function. Parameters C1-C4 shown in Table 7 are 2th, 4th, 6th and 8th order coefficients of the diffractive optical surface polynomial.

TABLE 7

| | S11 |
|---|---|
| C1 | −1.01E−01 |
| C2 | 3.04E−02 |
| C3 | 7.66E−03 |
| C4 | −3.99E−03 |

Table 8 lists different values of a half-FOV at different height positions according to the first, second and third embodiments of the invention. In an optical projection system, the half-FOV is an included angle made between an optical axis and a chief ray originated from a height position of an effective area of the light valve and casted on a lens surface closet to the magnified side.

TABLE 8

| FIELD | half-FOV first embodiment | half-FOV second embodiment | half-FOV third embodiment |
|---|---|---|---|
| 0 | 0.00 | 0.00 | 0.00 |
| 0.1 | 4.86 | 5.25 | 5.10 |
| 0.2 | 9.81 | 10.47 | 10.26 |
| 0.3(A) | 14.79 | 15.54 | 15.40 |
| 0.4(B) | 19.71 | 20.41 | 20.37 |
| 0.5(C) | 24.56 | 25.07 | 25.11 |
| 0.6 | 29.14 | 29.25 | 29.41 |
| 0.7 | 33.30 | 33.07 | 33.31 |
| 0.8 | 37.12 | 36.87 | 37.21 |
| 0.9 | 40.69 | 40.72 | 40.98 |
| 1 | 44.10 | 44.29 | 44.29 |

An image height formed at the image plane of the optical lens 10 on the second side (minified side) is denoted as H, and the image height H is equally divided into ten sections to from ten height positions 0.1H, 0.2H, 0.3H, 0.4H, 0.5H, 0.6H, 0.7H, 0.8H, 0.9H and 1H. A chief ray originated from the height position of 0.4H and passing through the optical lens 10 to reach the surface Si of the first lens makes an angle B with respect to the optical axis 12. A chief ray originated from the height position of 0.5H and passing through the optical lens 10 to reach the surface Si of the first lens makes an angle C with respect to the optical axis 12, and a difference between the angle B and the angle C is larger than 4.5 degrees. A chief ray originated from the height position of 0.3H and passing through the optical lens 10 to reach the surface Si of the first lens makes an angle A with respect to the optical axis 12, and a difference between the angle B and the angle A is larger than 4.7 degrees.

Table 9 shows shapes of each of the aspheric lenses L1-L5 respectively in an axial region, a middle region, and a periphery region according to the first, second and third embodiments of the invention.

TABLE 9

| | first embodiment | second embodiment | third embodiment |
|---|---|---|---|
| first lens | magnified side/minified side | magnified side/minified side | magnified side/minified side |
| axial region | convex/concave | convex/concave | convex/concave |
| middle region | convex/concave | convex/concave | convex/concave |
| periphery region | convex/concave | convex/concave | convex/concave |
| second lens | magnified side/minified side | magnified side/minified side | magnified side/minified side |
| axial region | concave/convex | concave/convex | concave/convex |
| middle region | concave/convex | concave/convex | concave/convex |
| periphery region | concave/convex | concave/convex | concave/convex |
| third lens | magnified side/minified side | magnified side/minified side | magnified side/minified side |
| axial region | concave/convex | concave/convex | concave/convex |
| middle region | concave/convex | concave/convex | concave/convex |
| periphery region | concave/convex | concave/convex | concave/convex |
| fourth lens | magnified side/minified side | magnified side/minified side | magnified side/minified side |
| axial region | concave/convex | concave/convex | convex/concave |
| middle region | concave/convex | concave/convex | convex/convex |
| periphery region | concave/convex | concave/convex | convex/convex |
| fifth lens | magnified side/minified side | magnified side/minified side | magnified side/minified side |
| axial region | convex/concave | concave/concave | convex/concave |
| middle region | convex/convex | convex/convex | concave/convex |
| periphery region | convex/convex | concave/convex | convex/convex |

As shown in Table 9, in the first, second and third embodiments, the surface S11 of the fifth lens facing the minified side (second side) has an inflection point between the axial region and the periphery region. In the second and third embodiments, the surface S10 of the fifth lens facing the magnified side (first side) has two inflection points between the axial region and the periphery region. In the third embodiment, the surface S9 of the fourth lens facing the minified side (second side) has an inflection point between the axial region and the periphery region.

Figure 5:
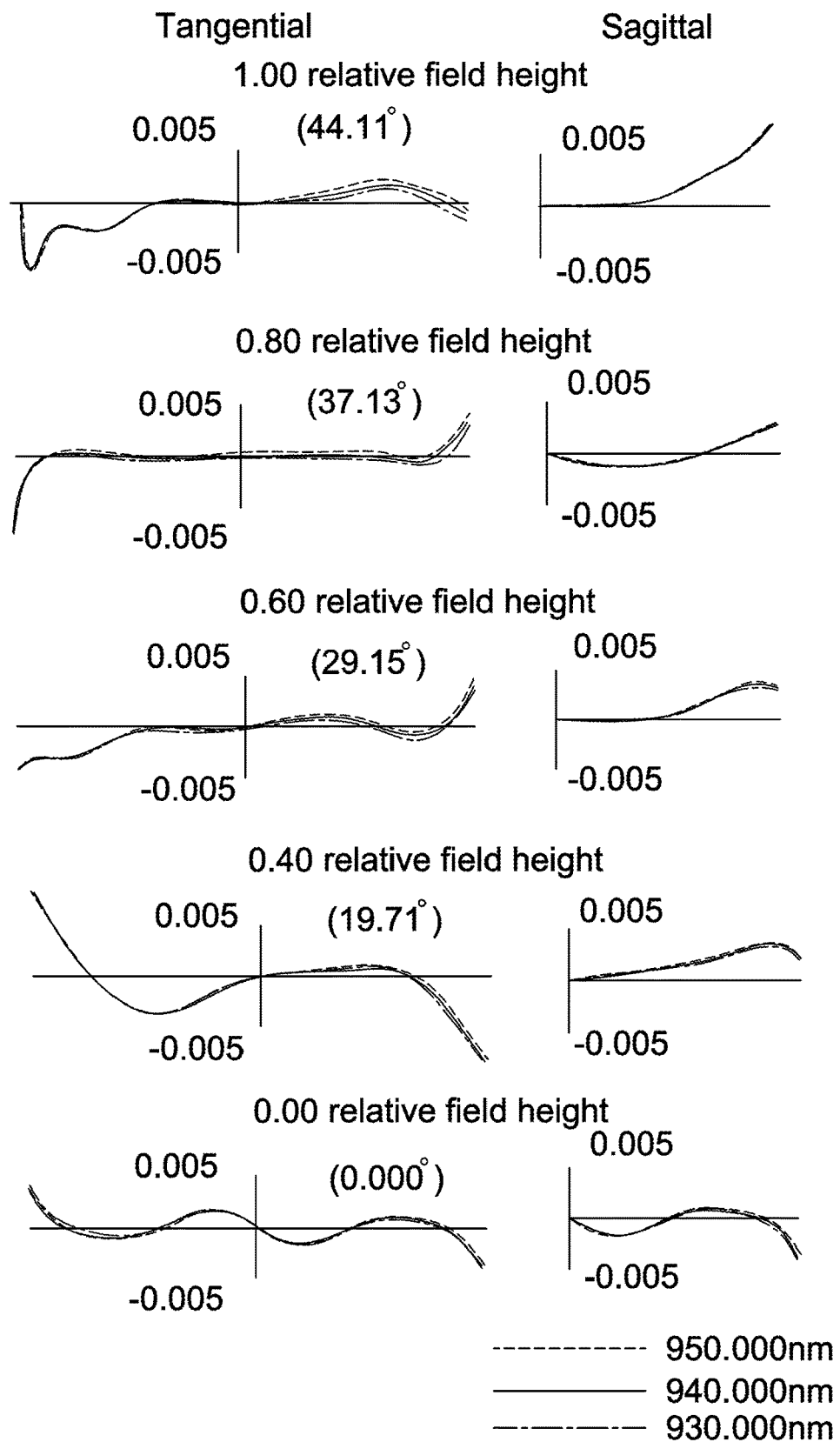
FIGS. 5-7 are ray fan plots of the optical lens shown in FIGS. 2-4 respectively for 930 nm, 940 nm and 950 nm infrared light, FIGS. 8-10 respectively illustrate astigmatic field curves and percentage distortion curves of the optical lens shown in FIGS. 2-4.
Figure 6:
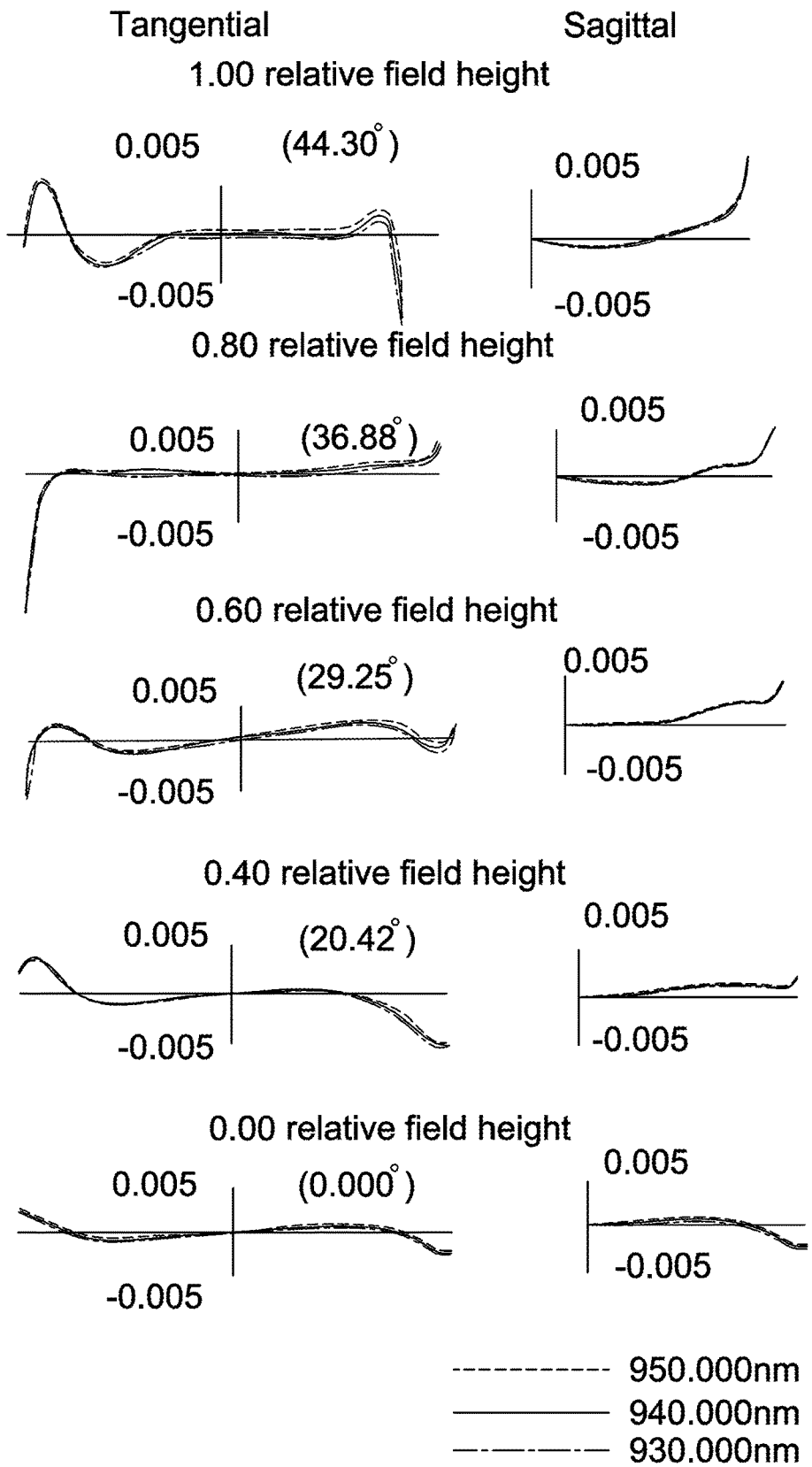
Figure 7:
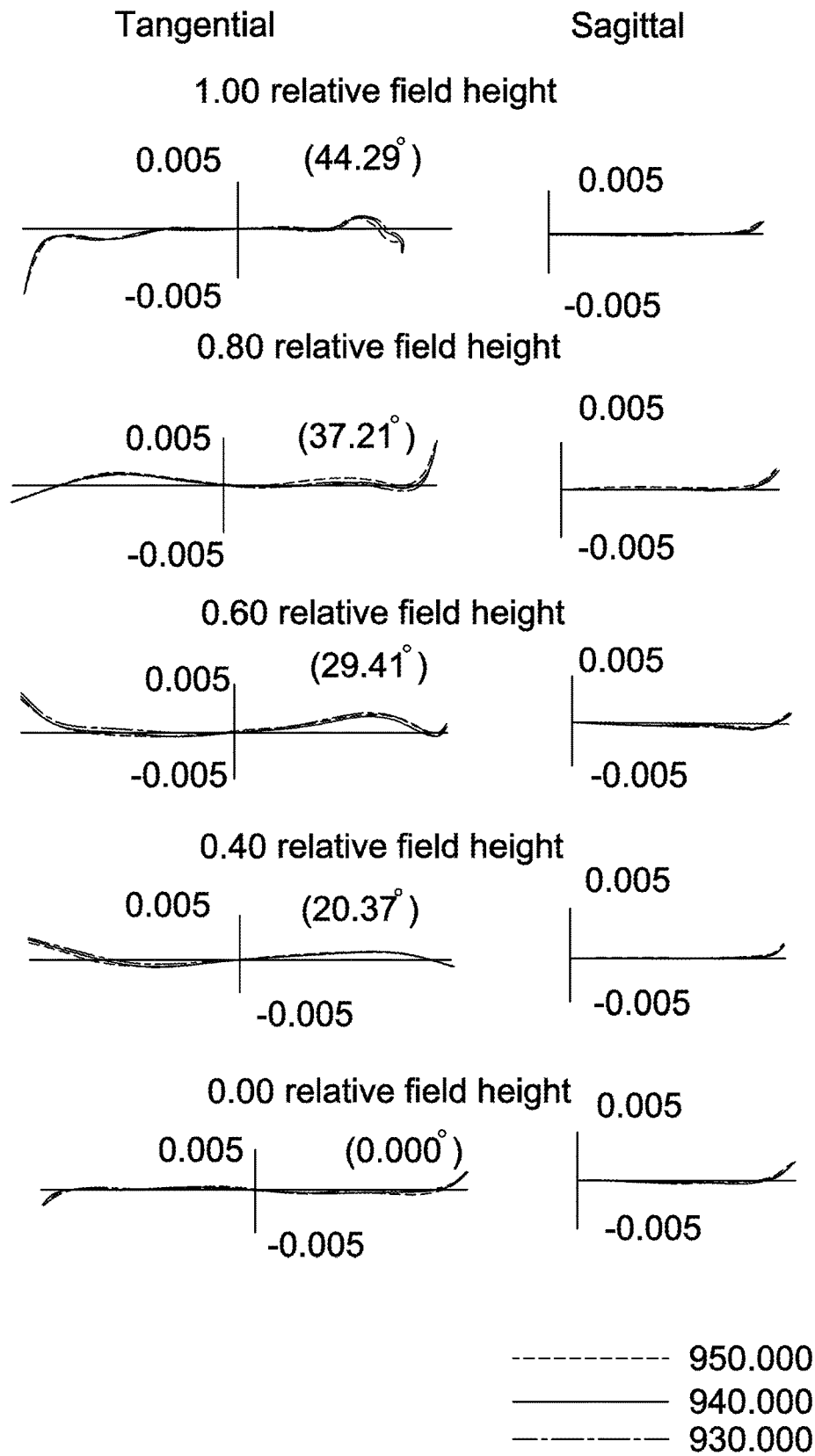
Figure 8:
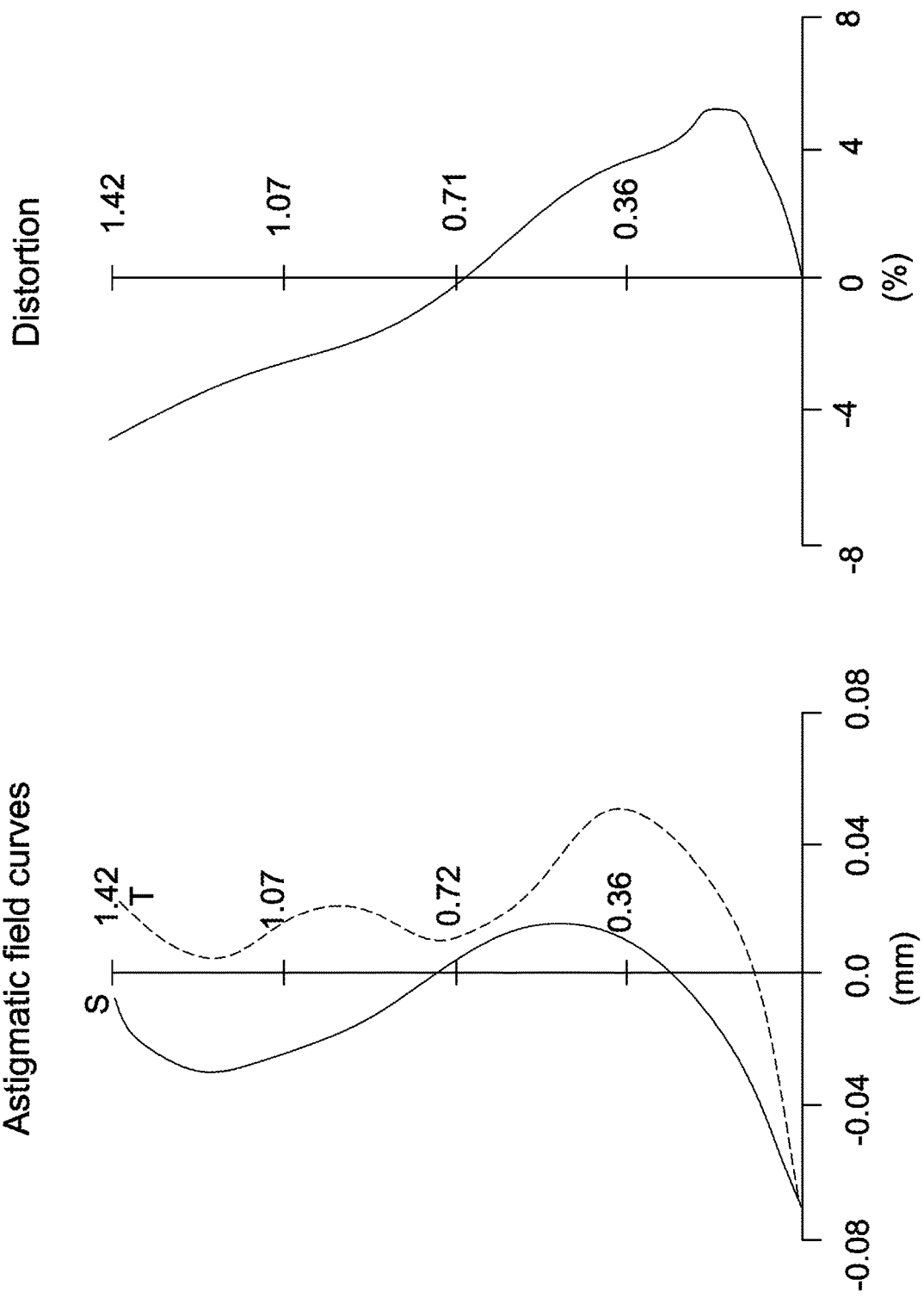
Figure 9:
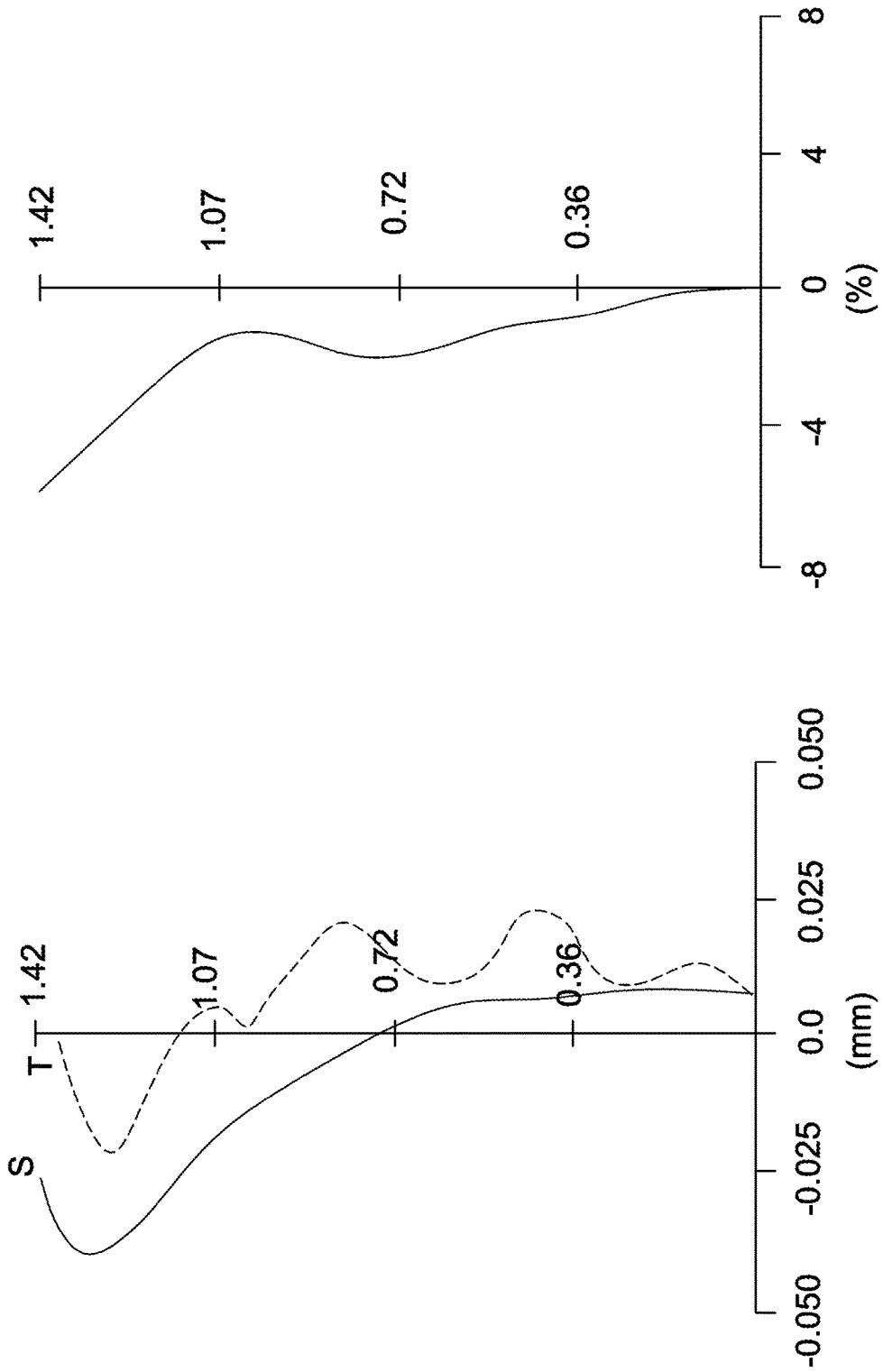
Figure 10:
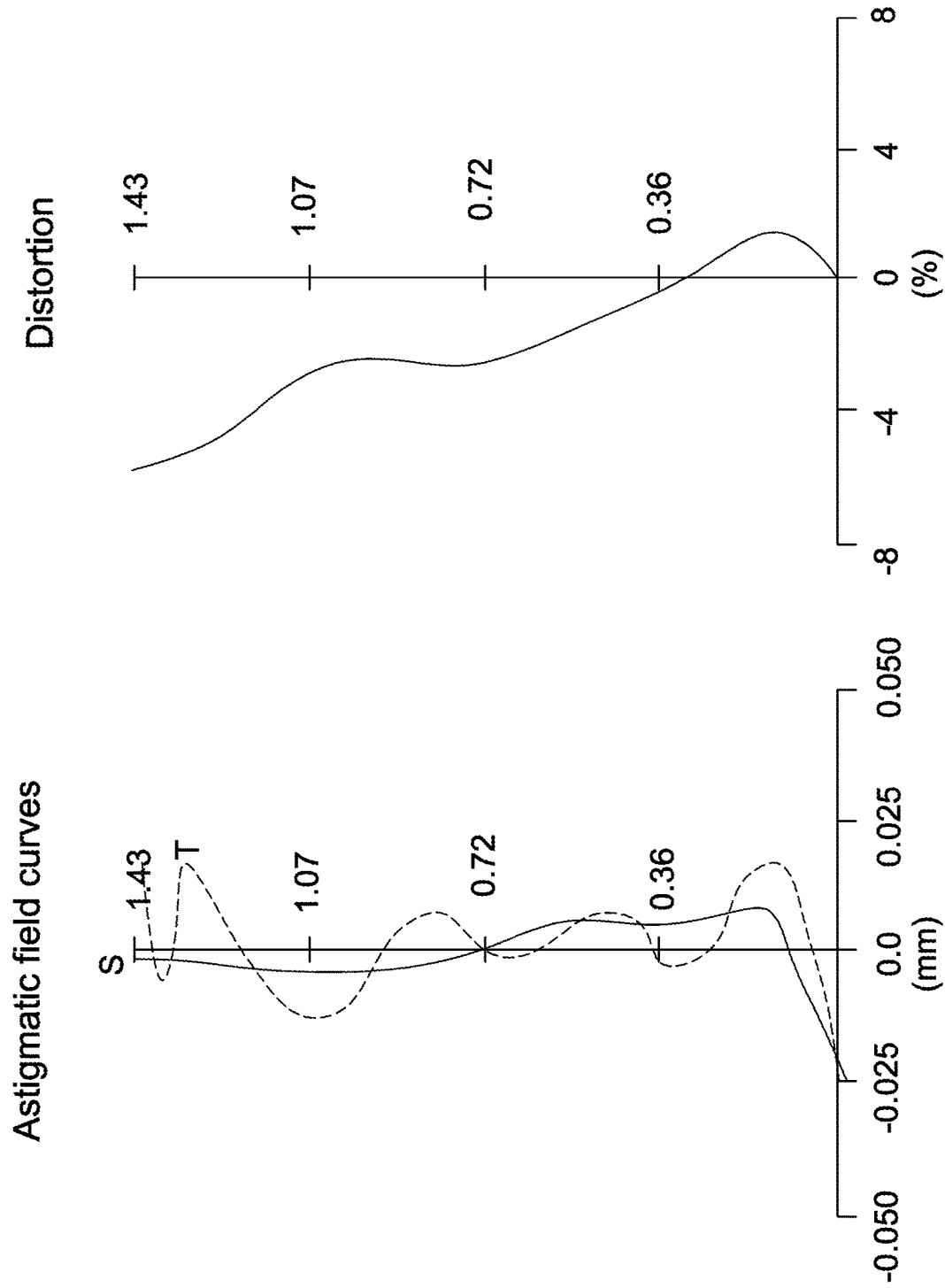
Figure 11:
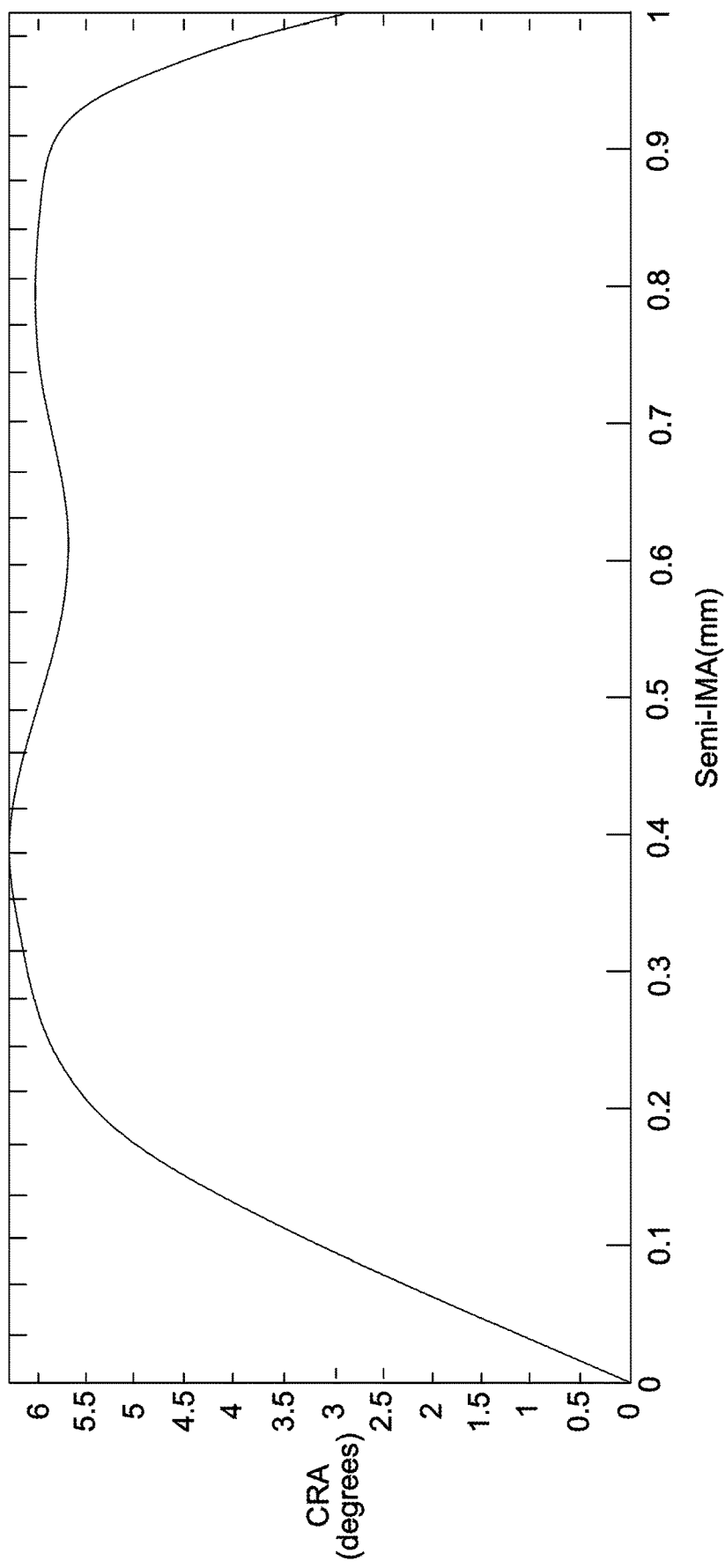
FIGS. 11-13 respectively illustrate curves of chief ray angles (CRA) of the optical lens shown in FIG. 2-4.
Figure 12:
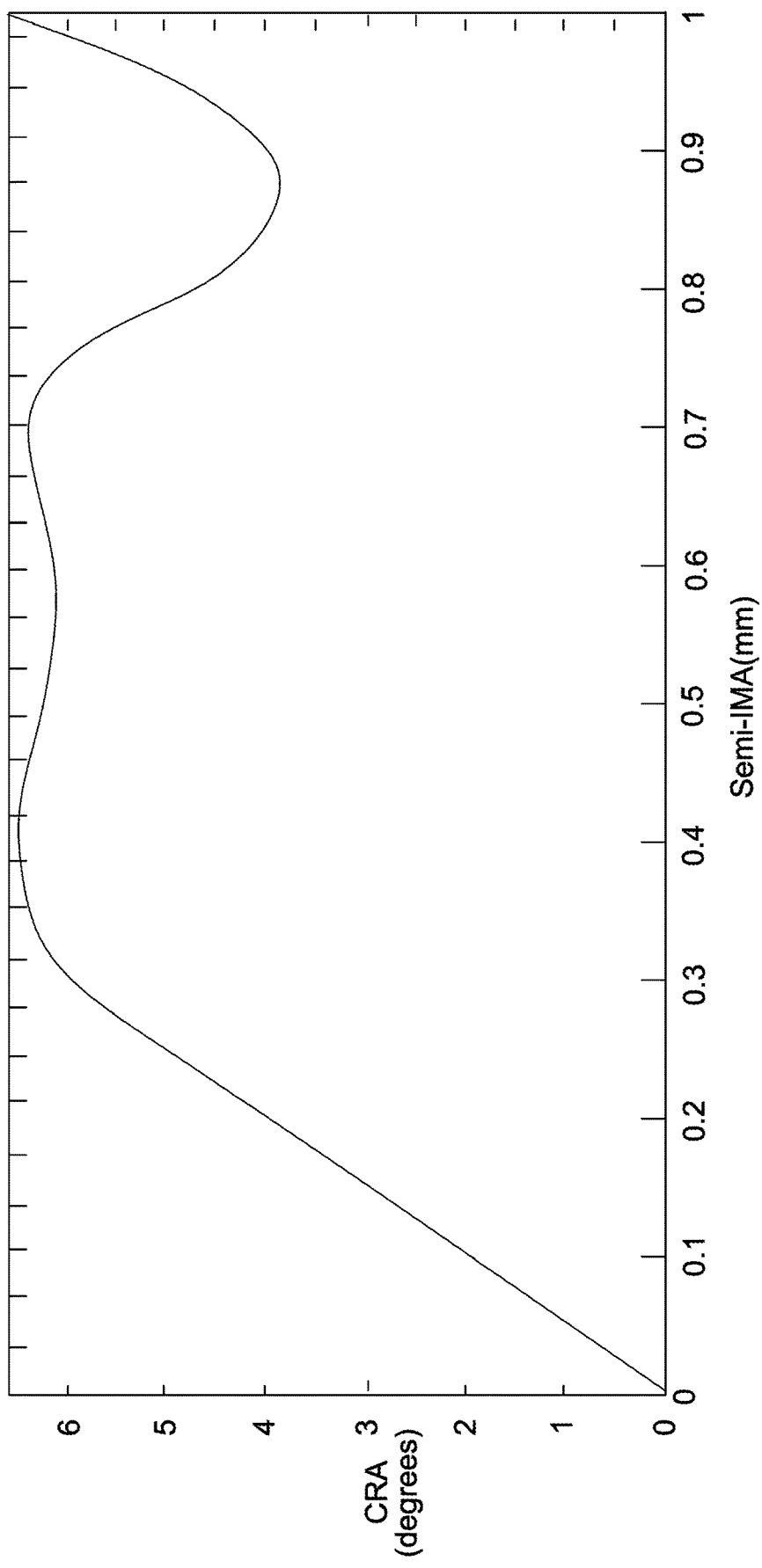
Figure 13:
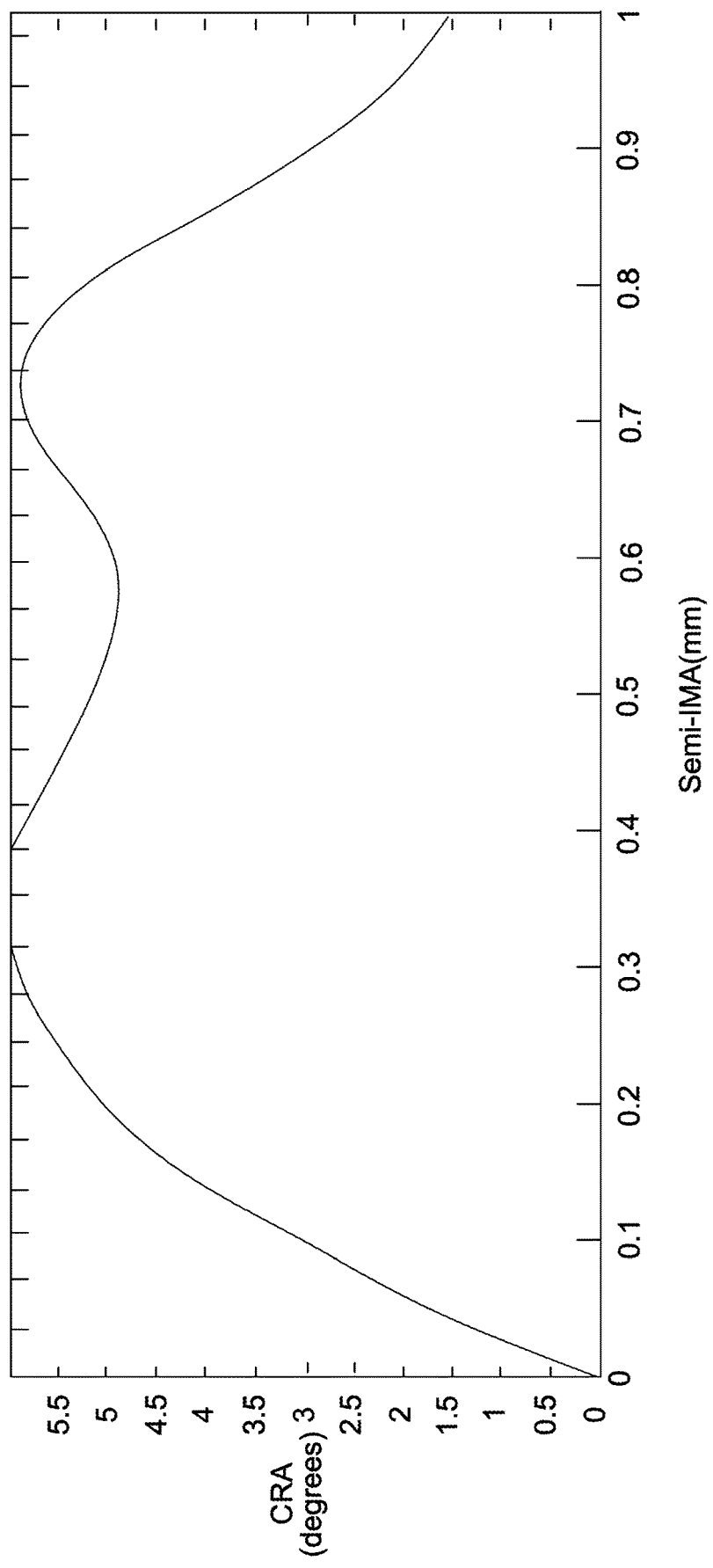

FIGS. 5-7 are ray fan plots of the optical lens 10 respectively for 930 nm, 940 nm and 950 nm infrared light, where an abscissa of the plot represents entrance pupil positions, and an ordinate of the plot represents relative numerical values of positions on an image plane (such as the image plane S12) where chief rays are projected. The left-hand side curves depict the data in a tangential direction, and the right-hand side curves depict the data in a sagittal direction. Note the 930 nm, 940 nm or 950 nm infrared light is an example of a reference standard for measurement, and the ray fan plots may be depicted according to other wavelength of infrared light. FIGS. 8-10 respectively illustrate astigmatic field curves and percentage distortion curves of the optical lens shown in FIGS. 2-4. FIGS. 11-13 respectively illustrate curves of chief ray angles (CRA) of the optical lens shown in FIG. 2-4. The simulated results shown in FIGS. 5-13 are within permitted ranges specified by the standard, which indicates the optical lens 10 according to the above embodiments may achieve good imaging quality.

Figure 14:
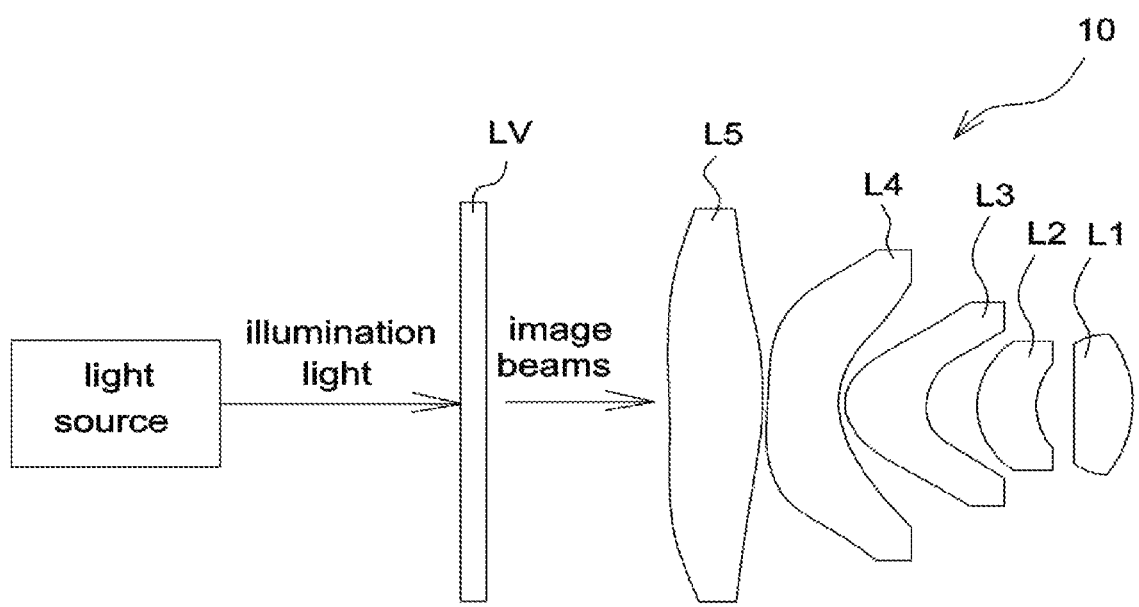
FIG. 14 illustrates the light propagation among a light source and an optical lens according to an embodiment of the invention.

Further, as shown in FIG. 14, one embodiment of the invention discloses a projection device having the optical lens 10 described in the above embodiments and other optical elements such as the light valve LV and an illumination light source. The light valve LV receives illumination light of the light source and transforms the illumination light into image beams, and the image beams pass through the optical lens 10 and are output as structured light. The projection device may be used in a portable device such as a mobile phone, and a light output side of the optical lens may face an object to be mapped. In one embodiment, the first lens, the second lens, the third lens, the fourth lens and the fifth lens are separate from each other. In one embodiment, the first lens, the second lens, the third lens and the fourth lens each have a refractive index of larger than 1.6.

According to the above embodiments, the optical lens has high light collection efficiency in the environment with limited space, has improved image quality, and is favorable for miniaturization.

Though the embodiments of the invention and design parameters in the tables have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, the number of lenses of each lens group or optical parameters such as refractive power for each lens may be changed, or a lens without affecting the overall optical performance may be additionally provided. It is intended that the scope of the invention be defined by the claims appended hereto and their equivalents in which all terms are meant in their broadest reasonable sense unless otherwise indicated.

What is claimed is:

1. An optical lens, comprising:
    five aspheric lenses being, arranged in order from a first side to a second side, a first lens, a second lens, a third lens, a fourth lens and a fifth lens; and
    an aperture stop disposed between the first lens and the second lens;
    wherein a distance along an optical axis between a surface of the first lens facing the first side and an image plane on the second side is smaller than 5 mm, an image height at the image plane is denoted as H, the image height is equally divided into ten sections to from ten height positions 0.1H, 0.2H, 0.3H, 0.4H, 0.5H, 0.6H, 0.7H, 0.8H, 0.9H and 1H, chief rays traveling through the optical lens and to the ten height positions respectively form ten angles with respect to a normal of the image plane, and each of the ten angles is smaller than 10 degrees.

2. The optical lens as claimed in claim 1, wherein the optical lens is used in a projection device.

3. The optical lens as claimed in claim 1, wherein the distance is smaller than 3 mm.

4. The optical lens as claimed in claim 1, wherein the fifth lens has a diffractive optical surface.

5. The optical lens as claimed in claim 1, wherein refractive powers of the first lens to the fifth lens satisfy one of the following conditions: (1) positive, positive, positive, negative and negative; (2) positive, positive, positive, positive and negative; and (3) positive, negative, positive, negative and positive.

6. The optical lens as claimed in claim 1, wherein the optical lens satisfies one of the following conditions: (1) the first lens, the second lens, the third lens, the fourth lens and the fifth lens are separate from each other; (2) the first lens, the second lens, the third lens and the fourth lens each have a refractive index of larger than 1.6; and (3) the fifth lens has at least one inflection point.

7. The optical lens as claimed in claim 1, wherein the optical lens satisfies the following condition:
    TTL/Ic<1.2, where TTL denotes a total track length being a distance along the optical axis between a surface of the first lens facing the first side and the image plane, and Ic denotes an image circle at the image plane.

8. The optical lens as claimed in claim 1, wherein the angle between each of the chief rays and the normal of the image plane is smaller than 7 degrees.

9. An optical lens, comprising:
    five aspheric lenses being, arranged in order from a first side to a second side, a first lens, a second lens, a third lens, a fourth lens and a fifth lens; and
    an aperture stop disposed among the five aspheric lenses;
    wherein a distance along an optical axis between a first surface of the first lens facing the first side and a second surface of the fifth lens facing the second side is smaller than 5 mm, an image height at the image plane on the second side is denoted as H, the image height is equally divided into ten sections to from ten height positions 0.1H, 0.2H, 0.3H, 0.4H, 0.5H, 0.6H, 0.7H, 0.8H, 0.9H and 1H, a chief ray originated from the height position of 0.4H and passing through the optical lens to reach the first surface of the first lens makes an angle B with the optical axis, a chief ray originated from the height position of 0.5H and passing through the optical lens to reach the first surface of the first lens makes an angle C with the optical axis, a difference between the angle B and the angle C is larger than 4.5 degrees, a chief ray originated from the height position of 0.3H and passing through the optical lens to reach the first surface of the first lens makes an angle A with the optical axis, and a difference between the angle B and the angle A is larger than 4.7 degrees.

10. The optical lens as claimed in claim 9, wherein the optical lens is used in a projection device.

11. The optical lens as claimed in claim 9, wherein the distance is smaller than 3 mm.

12. The optical lens as claimed in claim 9, wherein the fifth lens has a diffractive optical surface.

13. The optical lens as claimed in claim 9, wherein refractive powers of the first lens to the fifth lens satisfy one of the following conditions: (1) positive, positive, positive, negative and negative; (2) positive, positive, positive, positive and negative; and (3) positive, negative, positive, negative and positive.

14. The optical lens as claimed in claim 9, wherein the optical lens satisfies one of the following conditions: (1) the first lens, the second lens, the third lens, the fourth lens and the fifth lens are separate from each other; (2) the first lens, the second lens, the third lens and the fourth lens each have a refractive index of larger than 1.6; and (3) the fifth lens has at least one inflection point.

15. The optical lens as claimed in claim 9, wherein the optical lens satisfies the following condition:
TTL/Ic<1.2, where TTL denotes a total track length being a distance along the optical axis between a surface of the first lens facing the first side and the image plane, and Ic denotes an image circle at the image plane.

16. A projection device, comprising:
a light source; and
a light valve and an optical lens comprising five aspheric lenses being a first lens, a second lens, a third lens, a fourth lens and a fifth lens arranged in order from a first side to a second side, the light valve being disposed between the light source and the fifth lens, a distance along an optical axis between a surface of the first lens facing the first side and a surface of the fifth lens facing the second side being smaller than 5 mm, wherein a first convex surface facing the first side is formed on an axial region of the first lens, a first concave surface facing the first side is formed on an axial region of the second lens, the third lens has a substantially meniscus shape, a second concave surface facing the first side is formed on an axial region of the third lens, a clear aperture of the fourth lens is larger than a clear aperture of the third lens, and an inflection point is formed on a surface of the fifth lens facing the first side.

17. The projection device as claimed in claim 16, wherein the fifth lens has a diffractive optical surface.

18. The projection device as claimed in claim 16, wherein refractive powers of the first lens to the fifth lens satisfy one of the following conditions: (1) positive, positive, positive, negative and negative; (2) positive, positive, positive, positive and negative; and (3) positive, negative, positive, negative and positive.

19. The projection device as claimed in claim 16, wherein the optical lens satisfies one of the following conditions: (1) the first lens, the second lens, the third lens, the fourth lens and the fifth lens are separate from each other; (2) the first lens, the second lens, the third lens and the fourth lens each have a refractive index of larger than 1.6; and (3) the fifth lens has at least one inflection point.

20. The projection device as claimed in claim 16, wherein the optical lens satisfies the following condition:
TTL/Ic<1.2, where TTL denotes a total track length being a distance along the optical axis between a surface of the first lens facing the first side and the image plane, and Ic denotes an image circle at the image plane.

* * * * *